United States Patent
Schroeder et al.

(10) Patent No.: US 10,938,765 B1
(45) Date of Patent: Mar. 2, 2021

(54) SYSTEMS AND METHODS FOR PREPARING EMAIL DATABASES FOR ANALYSIS

(71) Applicant: Veritas US IP Holdings LLC, Mountain View, CA (US)

(72) Inventors: Ryan Schroeder, Roseville, MN (US); Sinh Nguyen, Eden Prairie, MN (US); Aaron Christensen, Apple Valley, MN (US); Kirk L. Searls, Blairsville, GA (US)

(73) Assignee: Veritas Technologies LLC, Santa Clara, CA (US)

(*) Notice: Subject to any disclaimer, the term of this patent is extended or adjusted under 35 U.S.C. 154(b) by 510 days.

(21) Appl. No.: 15/067,222

(22) Filed: Mar. 11, 2016

(51) Int. Cl.
*H04L 12/58* (2006.01)

(52) U.S. Cl.
CPC .............. *H04L 51/22* (2013.01); *H04L 51/12* (2013.01)

(58) Field of Classification Search
CPC ................................ H04L 51/12; H04L 51/22
See application file for complete search history.

(56) References Cited

U.S. PATENT DOCUMENTS

| | | | |
|---|---|---|---|
| 7,610,342 B1 | 10/2009 | Pettigrew et al. | |
| 8,074,043 B1* | 12/2011 | Zeis | G06F 16/1748 711/171 |
| 9,286,314 B2* | 3/2016 | Aronovich | G06F 3/0644 |
| 2008/0235402 A1* | 9/2008 | Azam | G06F 17/30569 709/248 |
| 2009/0132490 A1* | 5/2009 | Okraglik | H04L 51/22 |
| 2009/0326969 A1* | 12/2009 | Paknad | G06Q 40/02 705/1.1 |
| 2010/0036813 A1* | 2/2010 | Cameron | H04L 63/105 707/726 |
| 2012/0016901 A1* | 1/2012 | Agarwal | G06F 17/30569 707/769 |
| 2016/0323230 A1* | 11/2016 | Marso | H04L 51/16 |
| 2016/0350007 A1* | 12/2016 | Choi | G06F 12/023 |
| 2017/0139914 A1* | 5/2017 | Newman | H04L 51/22 |

OTHER PUBLICATIONS

Kirk L. Searls, et al; Systems and Methods for Updating Email Analytics Databases; U.S. Appl. No. 15/067,227, filed Mar. 11, 2016.

(Continued)

*Primary Examiner* — Alina A Boutah
(74) *Attorney, Agent, or Firm* — FisherBroyles, LLP

(57) ABSTRACT

The disclosed computer-implemented method for preparing email databases for analysis may include (1) identifying an email database that stores a plurality of emails in a plurality of tables that are formatted to be managed by a specific email application, (2) using a component of the specific email application to retrieve the plurality of emails from the database, (3) creating a denormalized dataset for the plurality of emails by combining email data from at least one table from the plurality of tables with email data from at least one other table from the plurality of tables, and (4) exporting at least a portion of the data from the denormalized dataset into at least one file in an interoperable format that is capable of being read by a plurality of applications. Various other methods, systems, and computer-readable media are also disclosed.

17 Claims, 7 Drawing Sheets

(56) References Cited

OTHER PUBLICATIONS

Bruce McCorkendale; Systems and Methods for Authenticating Users; U.S. Appl. No. 14/834,949, filed Aug. 25, 2015.
Knowledge Vault, https://en.wikipedia.org/wiki/Knowledge_Vault, as accessed Feb. 2, 2016, Wikipedia, (Oct. 17, 2014).
MailDetective, http://advsoft.info/products/maildetective/, as accessed Feb. 2, 2016, ADVSoft, (Jun. 24, 2008).
MailXaminer, https://www.mailxaminer.com/, as accessed 2/2/6, (Dec. 30, 2012).
Wihl/Timberwolf, https://github.com/wihl/Timberwolf, as accessed Feb. 2, 2016, (On of before 2011).
Splunk, https://www.splunk.com/en_us/homepage.html, as accessed Feb. 2, 2016, (Jan. 19, 2015).
Kroll Ontrack, https://www.krollontrack.com/, as accessed Feb. 2, 2016, (Jun. 28, 2002).
Backup and Recovery, https://www.veritas.com/product/backup-and-recovery, as accessed Feb. 2, 2016, Veritas Technologies, (Jan. 22, 2016).
Enterprise Vault, https://www.veritas.com/product/information-governance/enterprise-vault, as accessed Feb. 2, 2016, Veritas Technologies, (Nov. 17, 2015).
Information Map, https://www.veritas.com/product/information-governance/information-map, as accessed Feb. 2, 2016, Veritas Technologies, (On or before Feb. 2, 2016).
Apache Spark, https://spark.apache.org/, as accessed Feb. 2, 2016, (Mar. 4, 2014).
Apache Hadoop, https://hadoop.apache.org/, as accessed Feb. 2, 2016, (May 13, 2008).
Apache HBase, https://hbase.apache.org/, as accessed Feb. 2, 2016, (May 18, 2010).
Apache Drill, https://drill.apache.org/, as accessed Feb. 2, 2016, (Dec. 1, 2014).
Apache Pig, https://pig.apache.org/, as accessed Feb. 2, 2016, (Oct. 12, 2010).
Apache Parquet, https://parquet.apache.org/, as accessed Feb. 2, 2016, (Apr. 27, 2015).
Hive, https://www-01.ibm.com/software/data/infosphere/hadoop/hive/, as accessed Feb. 2, 2016, (Mar. 31, 2012).
Microsoft Exchange Server, https://en.wikipedia.org/wiki/Microsoft_Exchange_Server, as accessed Feb. 2, 2016, Wikipedia, (Mar. 30, 2004).
Apache Storm, https://storm.apache.org/, as accessed Feb. 2, 2016, (Sep. 26, 2014).
Kate Lewis, Veritas Velocity v1.0 Alpha registration is now open!, https://vox.veritas.com/t5/Copy-Data-Management-Velocity/Veritas-Velocity-v1-0-Alpha-registration-is-now-open/ba-p/791403, as accessed Feb. 2, 2016, (Jun. 10, 2015).

* cited by examiner

SYSTEMS AND METHODS FOR PREPARING EMAIL DATABASES FOR ANALYSIS

BACKGROUND

Enterprises may need to analyze email for a variety of reasons, such as sentiment analysis and security. For example, noticing a large spike in unhappy or worried emails may help management detect a problem early on and rectify it. However, production email databases may be difficult or unsafe to analyze. First, an organization's production email server may be off-limits due to performance concerns. Heavy querying of a live mail server may slow or crash it, causing an email outage. Secondly, an email database's data files may be opaque and/or proprietary and thus difficult to run analytics on. Some analytics tools may be unable to read the type of data files used by the email database.

Some traditional systems may rely on administrators to manually copy the files from a production database to an analysis database. This may be a lengthy process, taking up valuable administrator time and delaying the ability of analysts to examine data in a timely manner. Some traditional systems may require the database to be in a safe state before data is copied, limiting the opportunities of these traditional systems to create copies of the data. Many traditional systems may create analysis databases that have the same structure as the original production database, requiring analysts to perform complicated queries in order to retrieve data. Accordingly, the instant disclosure identifies and addresses a need for additional and improved systems and methods for preparing email databases for analysis.

SUMMARY

As will be described in greater detail below, the instant disclosure describes various systems and methods for preparing email databases for analysis by using a component of an email application designed to manage the email database to retrieve emails from the database and then creating a new, denormalized dataset for analysis that may be exported as any number of interoperable formats.

In one example, a computer-implemented method for preparing email databases for analysis may include (1) identifying an email database that stores a group of emails in a group of tables that are formatted to be managed by a specific email application, (2) using a component of the specific email application to retrieve the emails from the database, (3) creating a denormalized dataset from the emails by combining email data from at least one table from the tables with email data from at least one other table from the tables, and (4) exporting at least a portion of the data from the denormalized dataset into at least one file in an interoperable format that is capable of being read by a group of applications.

In one embodiment, the component of the specific email application may include a dynamic link library (DLL) that is used by the specific email application. In some examples, using the component of the specific email application to retrieve the emails may include using an application programming interface (API) to communicate with the component of the application. In one embodiment, the email database may include a backup of a production email database where the emails originate.

In some examples, creating the denormalized dataset may include combining all of the tables within the tables into a single table. In some examples, exporting at least the portion of the data from the denormalized dataset may include splitting the data into a group of files. In one embodiment, the interoperable format may include a columnar storage format.

In one embodiment, a system for implementing the above-described method may include (1) an identification module, stored in memory, that identifies an email database that stores a group of emails in a group of tables that are formatted to be managed by a specific email application, (2) a retrieval module, stored in memory, that uses a component of the specific email application to retrieve the emails from the database, (3) a creation module, stored in memory, that creates a denormalized dataset from the emails by combining email data from at least one table from the tables with email data from at least one other table from the tables, (4) an export module, stored in memory, that exports at least a portion of the data from the denormalized dataset into at least one file in an interoperable format that is capable of being read by a group of applications, and (5) at least one physical processor configured to execute the identification module, the retrieval module, the creation module, and the export module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) identify an email database that stores a group of emails in a group of tables that are formatted to be managed by a specific email application, (2) use a component of the specific email application to retrieve the emails from the database, (3) create a denormalized dataset from the emails by combining email data from at least one table from the tables with email data from at least one other table from the tables, and (4) export at least a portion of the data from the denormalized dataset into at least one file in an interoperable format that is capable of being read by a group of applications.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
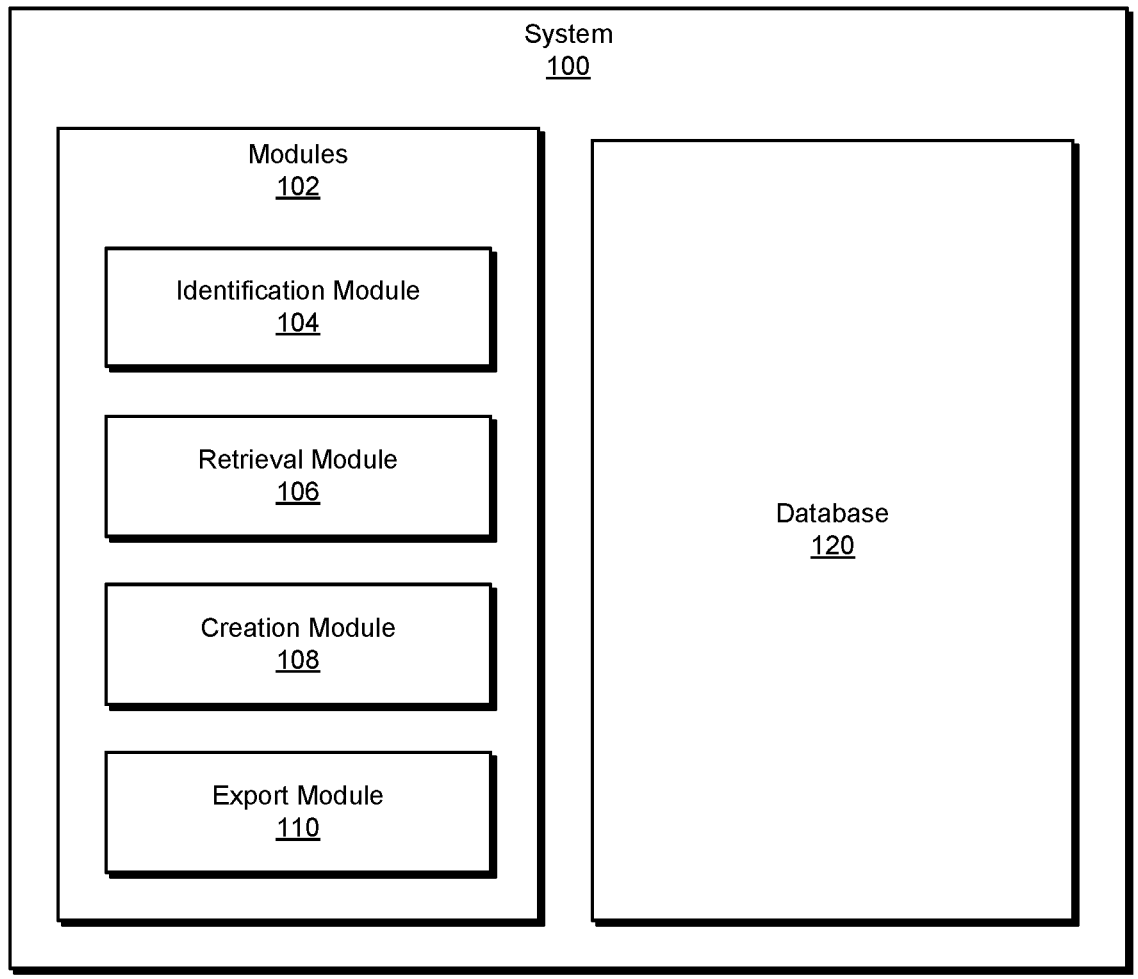
FIG. 1 is a block diagram of an exemplary system for preparing email databases for analysis.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for preparing email databases for analysis. As will be explained in greater detail below, by creating an analytics-friendly email database with a denormalized table structure and exporting data from the database in an interoperable format, the systems described herein may enable analysts to quickly and efficiently analyze recent email data without risk to production email servers.

The following will provide, with reference to FIGS. 1, 2, 4, and 5, detailed descriptions of exemplary systems for preparing email databases for analysis. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 6 and 7, respectively.

FIG. 1 is a block diagram of exemplary system 100 for preparing email databases for analysis. As illustrated in this figure, exemplary system 100 may include one or more modules 102 for performing one or more tasks. For example, and as will be explained in greater detail below, exemplary system 100 may include an identification module 104 that identifies an email database that stores a plurality of emails in a plurality of tables that are formatted to be managed by a specific email application. Exemplary system 100 may additionally include a retrieval module 106 that uses a component of the specific email application to retrieve the plurality of emails from the database. Exemplary system 100 may also include a creation module 108 that creates a denormalized dataset from the plurality of emails by combining email data from at least one table from the plurality of tables with email data from at least one other table from the plurality of tables. Exemplary system 100 may additionally include an export module 110 that exports at least a portion of the data from the denormalized dataset into at least one file in an interoperable format that is capable of being read by a plurality of applications. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 610 in FIG. 6, and/or portions of exemplary network architecture 700 in FIG. 7. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store emails and/or email data.

Database 120 may represent portions of a single database or computing device or a plurality of databases or computing devices. For example, database 120 may represent a portion of server 206 in FIG. 2, computing system 610 in FIG. 6, and/or portions of exemplary network architecture 700 in FIG. 7. Alternatively, database 120 in FIG. 1 may represent one or more physically separate devices capable of being accessed by a computing device, such as server 206 in FIG. 2, computing system 610 in FIG. 6, and/or portions of exemplary network architecture 700 in FIG. 7.

Figure 2:
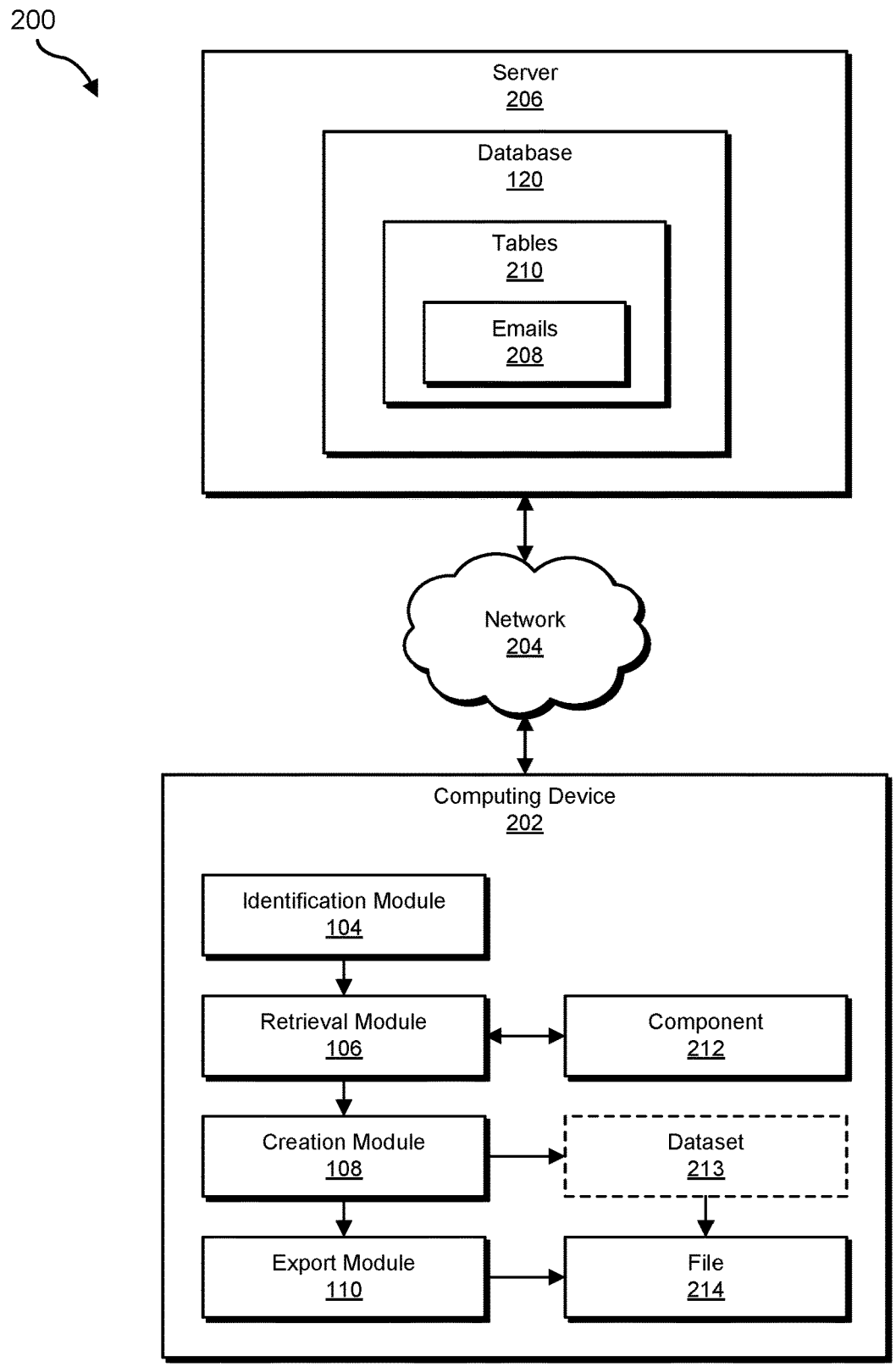
FIG. 2 is a block diagram of an additional exemplary system for preparing email databases for analysis.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network 204. In one example, computing device 202 may be programmed with one or more of modules 102 and/or may store all or a portion of the data in database 120. Additionally or alternatively, server 206 may be programmed with one or more of modules 102 and/or may store all or a portion of the data in database 120.

In one embodiment, one or more of modules 102 from FIG. 1 may, when executed by at least one processor of computing device 202 and/or server 206, enable computing device 202 and/or server 206 to prepare email databases for analysis. For example, and as will be described in greater detail below, identification module 104 may identify database 120 that stores emails 208 in tables 210 that are formatted to be managed by a specific email application. Next, retrieval module 106 may use a component 212 of the specific email application to retrieve emails 208 from the database. After emails 208 are retrieved, creation module 108 may create dataset 213 from emails 208 by combining email data from at least one table from tables 210 with email data from at least one other table from tables 210. Immediately or at some later time, export module 110 may export at least a portion of the data from dataset 213 into at least one file 214 in an interoperable format that is capable of being read by a plurality of applications.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 610 in FIG. 6, or any other suitable computing device.

Server 206 generally represents any type or form of computing device that is capable of hosting one or more databases. Examples of server 206 include, without limitation, application servers and database servers configured to provide various database services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 700 in FIG. 7, or the like. Network 204 may facilitate communication or data transfer using wireless or wired connections. In one embodiment, network 204 may facilitate communication between computing device 202 and server 206.

Figure 3:
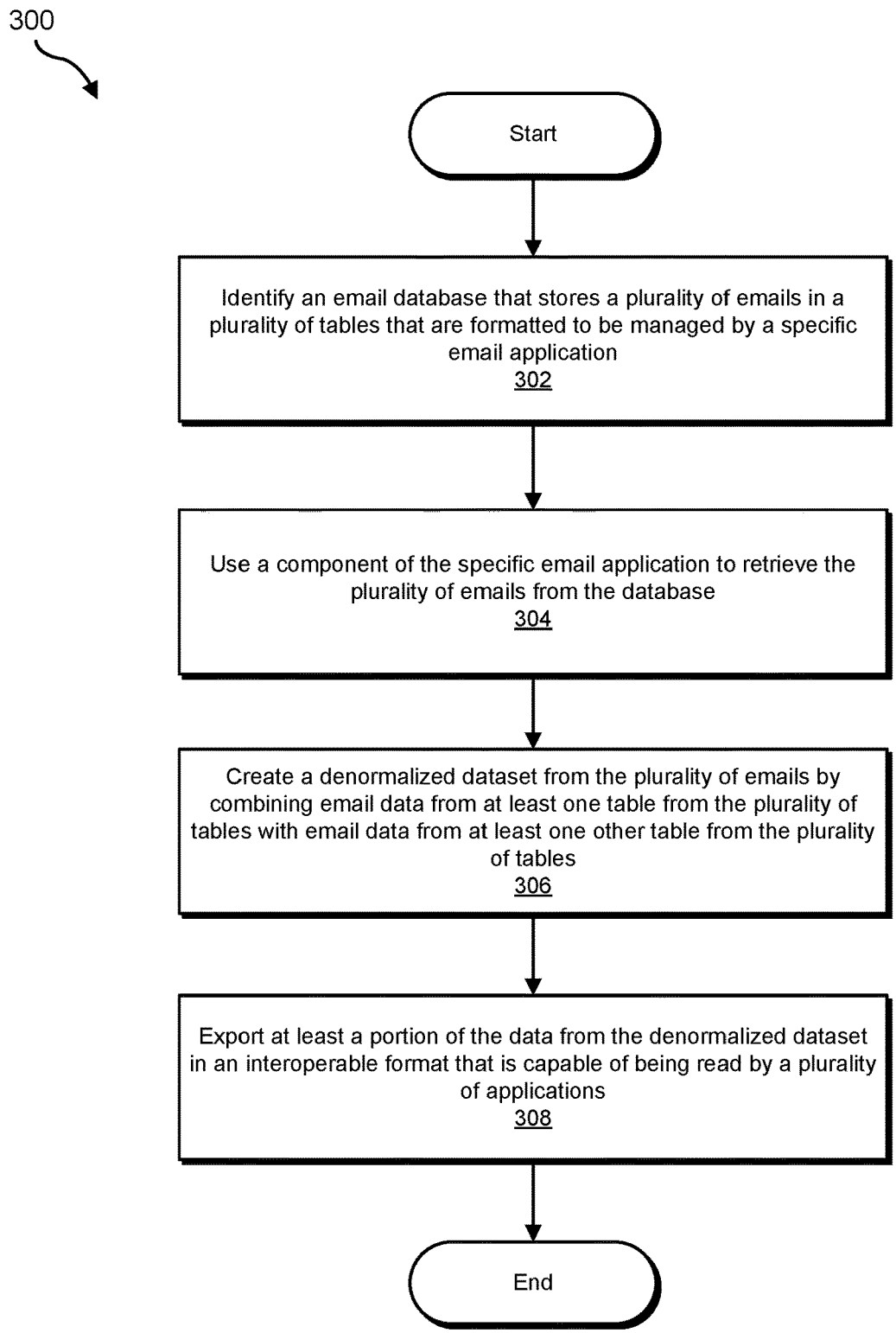
FIG. 3 is a flow diagram of an exemplary method for preparing email databases for analysis.

FIG. 3 is a flow diagram of an exemplary computer-implemented method 300 for preparing email databases for analysis. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302, one or more of the systems described herein may identify an email database that stores a plurality of emails in a plurality of tables that are formatted to be managed by a specific email application. For example, identification module 104 may, as part of computing device 202 in FIG. 2, identify email database 120 that stores emails 208 in a tables 210 that are formatted to be managed by a specific email application.

The term "email," as used herein, generally refers to any form of electronic communication. In some embodiments, an email may include a sender, one or more recipients, a timestamp, a subject, a body, and/or attachments.

The term "email database," as used herein, generally refers to any database that stores emails and/or data about emails. In one embodiment, the email database may include a backup of a production email database where the plurality of emails originate. In this embodiment, the production email database may be a live database that stores emails as soon as they are created and/or sent and/or that receives queries from users' email applications and the backup may be a backup copy of the live production database. In some examples, the backup may be the most recently created backup copy of the production database. Additionally or alternatively, the backup may be part of a copy data management system.

The term "specific email application," as used herein, generally refers to any named product line of an email application from a particular vendor. In some embodiments, a specific email application may refer to a particular version of an email application. In some examples, a specific email application may include an email server application. Examples of specific email applications may include, without limitation, MICROSOFT EXCHANGE SERVER 2016, POSTFIX 3.0, and/or SENDMAIL-8.15.2.

Identification module 104 may identify the email database from within a variety of contexts. For example, identification module 104 may be hosted on the same server as the email database. In another embodiment, identification module 104 may be hosted on a separate server and/or another type of computing device.

At step 304, one or more of the systems described herein may use a component of the specific email application to retrieve the plurality of emails from the database. For example, retrieval module 106 may, as part of computing device 202 in FIG. 2, use component 212 of the specific email application to retrieve emails 208 from the database.

The term "component," as used herein, generally refers to portion and/or module of an email application. In one embodiment, the component of the specific email application may include a DLL that is used by the specific email application. For example, the component may be the ese.dll used by a particular version of MICROSOFT EXCHANGE SERVER.

Retrieval module 106 may retrieve the emails in a variety of ways. For example, retrieval module 106 may use the component of the specific email application to retrieve the plurality of emails by using an API to communicate with the component of the application. In some examples, retrieval module 106 may use an API that is part of a DLL to retrieve emails from an email database. For example, retrieval module 106 may query the API for ese.dll to retrieve emails from a MICROSOFT EXCHANGE SERVER database.

In some embodiments, retrieval module 106 may include components from multiple specific email applications. For example, retrieval module 106 may include DLLs from multiple versions of MICROSOFT EXCHANGE and may determine which version to use based on the version of MICROSOFT EXCHANGE running the email defense.

Additionally or alternatively, retrieval module 106 may use a component specified by a user. For example, a user may provide a DLL relevant to the email database being processed. In some embodiments, retrieval module 106 may run security checks to ensure that a component provided by a user does not include malicious code. For example, retrieval module 106 may check the signature of a DLL purporting to be a MICROSOFT EXCHANGE DLL in order to verify that the DLL is signed by MICROSOFT.

At step 306, one or more of the systems described herein may create a denormalized dataset for the plurality of emails by combining email data from at least one table from the plurality of tables with email data from at least one other table from the plurality of tables. For example, creation module 108 may, as part of computing device 202 in FIG. 2, create a dataset 213 from emails 208 by combining email data from at least one table from tables 210 with email data from at least one other table from tables 210.

The term "denormalized dataset," as used herein, generally refers to any dataset that is optimized for analytics. For example, a denormalized dataset may include data stored in only a single table or in relatively few tables. In some embodiments, a denormalized dataset may include a large number of columns.

Creation module 108 may create the denormalized dataset in a variety of ways. For example, creation module 108 may combine all of the tables in the email database into one table in the denormalized dataset. In another embodiment, creation module 108 may create a denormalized dataset that includes several tables. In some embodiments, creation module 108 may populate an analytics database with the data in the denormalized dataset. In other embodiments, creation module 108 may only temporarily store the data in the denormalized dataset as part of the process of exporting the denormalized dataset into one or more files.

Figure 4:
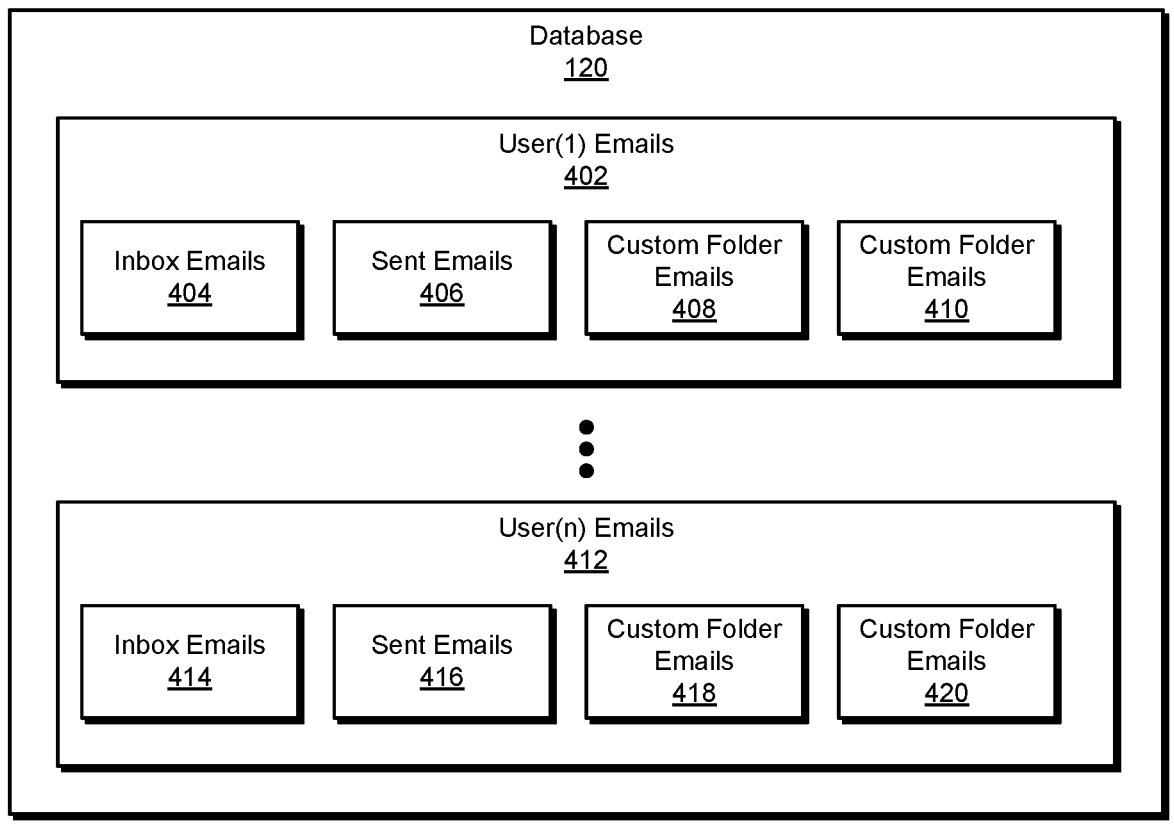
FIG. 4 is a block diagram of an exemplary computing system for preparing email databases for analysis.
Figure 4:
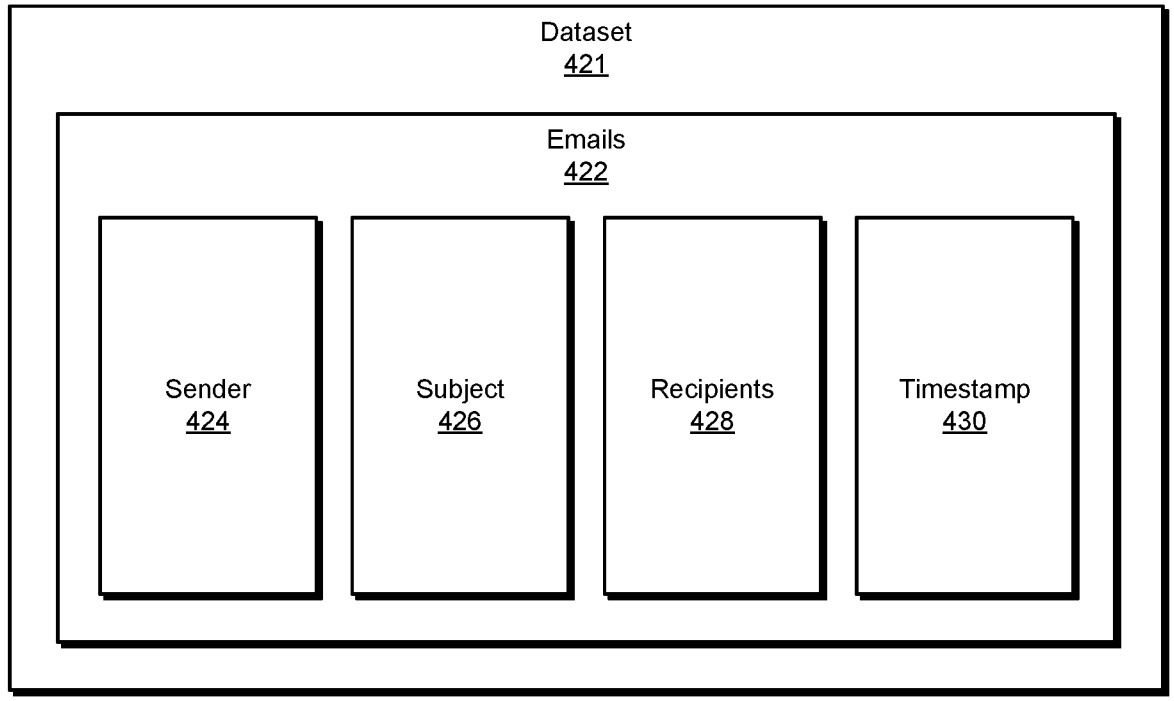

In some embodiments, a denormalized dataset may include fewer tables than the original email database. For example, as illustrated in FIG. 4, database 120 may include email data for a large number of users, including user(1) emails 402 and/or user(n) emails 412. Each set of email data may be spread across a number of tables. In one example, the data for user(1) emails 402 may be spread across the tables inbox emails 404, sent emails 406, custom folder emails 408, and/or custom folder emails 410. Similarly, in this example, the data for user(n) emails 412 may be spread across the tables inbox emails 414, sent emails 416, custom folder emails 418, and/or custom folder emails 420. In other examples, email data in database 120 may be separated into tables in other ways.

In some embodiments, creation module 108 may combine multiple tables from database 120 when creating dataset 421. In one example, dataset 421 may include the table emails 422, which may have columns sender 424, subject 426, recipients 428, and/or timestamp 430. In some embodiments, emails 422 may be the only table in dataset 421. In some embodiments, dataset 421 may include additional columns including but not limited to attachments, full path of email folders, and/or date sent. In some embodiments, dataset 421 may represent an analytics database. In other embodiments, dataset 421 may represent a temporary structure in memory.

Returning to FIG. 3, at step 308, one or more of the systems described herein may export at least a portion of the data from the denormalized dataset into at least one file in an interoperable format that is capable of being read by a plurality of applications. For example, export module 110 may, as part of computing device 202 in FIG. 2, export at least a portion of the data from dataset 213 into at least one file 214 in an interoperable format that is capable of being read by a plurality of applications.

The term "interoperable format," as used herein, generally refers to any format designed to be read by multiple applications. In some embodiments, the interoperable format may be a lightweight format such as the comma separated value format. In some embodiments, the interoperable format may be a columnar storage format such as PARQUET.

Export module 110 may export the data in a variety of ways. For example, export module 110 may split the data into a plurality of files. In one example, export module 110 may export the data to an analysis service that uses data blocks. In this example, export module 110 may split the data into files that are each slightly smaller than the size of data block used by the analysis service. In some embodiments, export module 110 may export the data by reading the data from an analytics database that stores the denormalized dataset. In other embodiments, export module 110 and creation module 108 may represent the same module, which may create the dataset as part of the export process and may subsequently no longer store the dataset.

Figure 5:
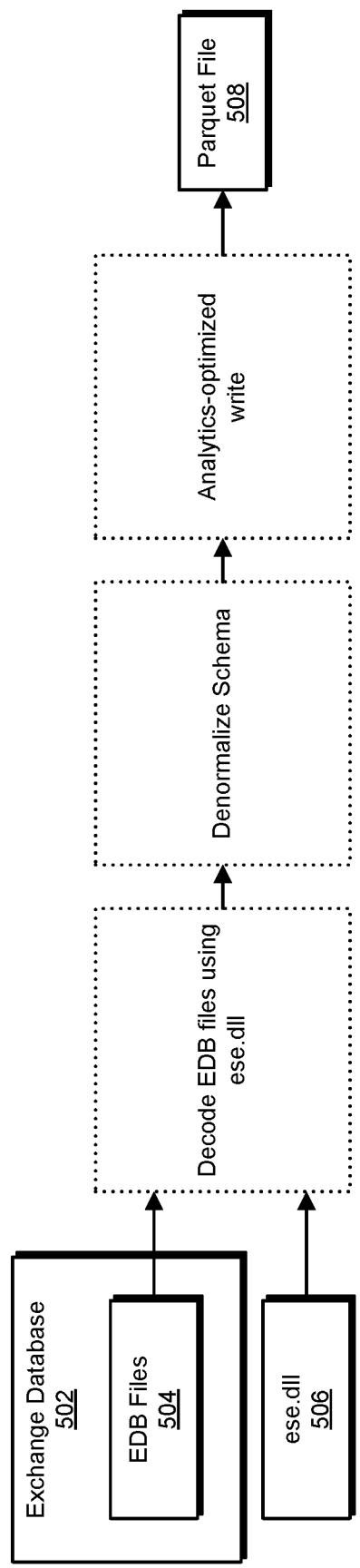
FIG. 5 is a block diagram of an exemplary computing system for preparing email databases for analysis.

In some examples, the systems described herein may transform some or all of the data in a MICROSOFT EXCHANGE database into a PARQUET file. For example, as illustrated in FIG. 5, an exchange database 502 may include exchange database (EDB) files 504. The systems described herein may use an ese.dll 506 to decode the EDB files. For example, the systems described herein may use an API to query the ese.dll in order to retrieve emails stored as EDB files. Next, the systems described herein may denormalize the schema by transforming the data into a denormalized dataset with fewer tables than exchange database 502 as part of an analytics-optimized write to create parquet file 508. In some examples, the systems described herein may create a file or files optimized for analysis tools such as HIVE, SPARK, PIG, HADOOP, HBASE, and/or DRILL.

As described in connection with method 300 above, the systems and methods described herein may allow analysts to access email data by creating a denormalized dataset from a backup of a production email database. First, the systems described herein may use a DLL from the email application to decode the proprietary files in the email database. Next, the systems described herein may create a denormalized dataset with, at most, a few tables. Either as part of the creation of the denormalized dataset or at a later time, the systems described herein may export data from the denormalized dataset into an interoperable format that can be read by a variety of analytics tools. By denormalizing and exporting data from a backup email database, the systems described herein may allow analysts up-to-date access to email data without compromising the performance or security of the production server, as well as allowing analysts to use modern analytical tools to efficiently analyze the data.

Figure 6:
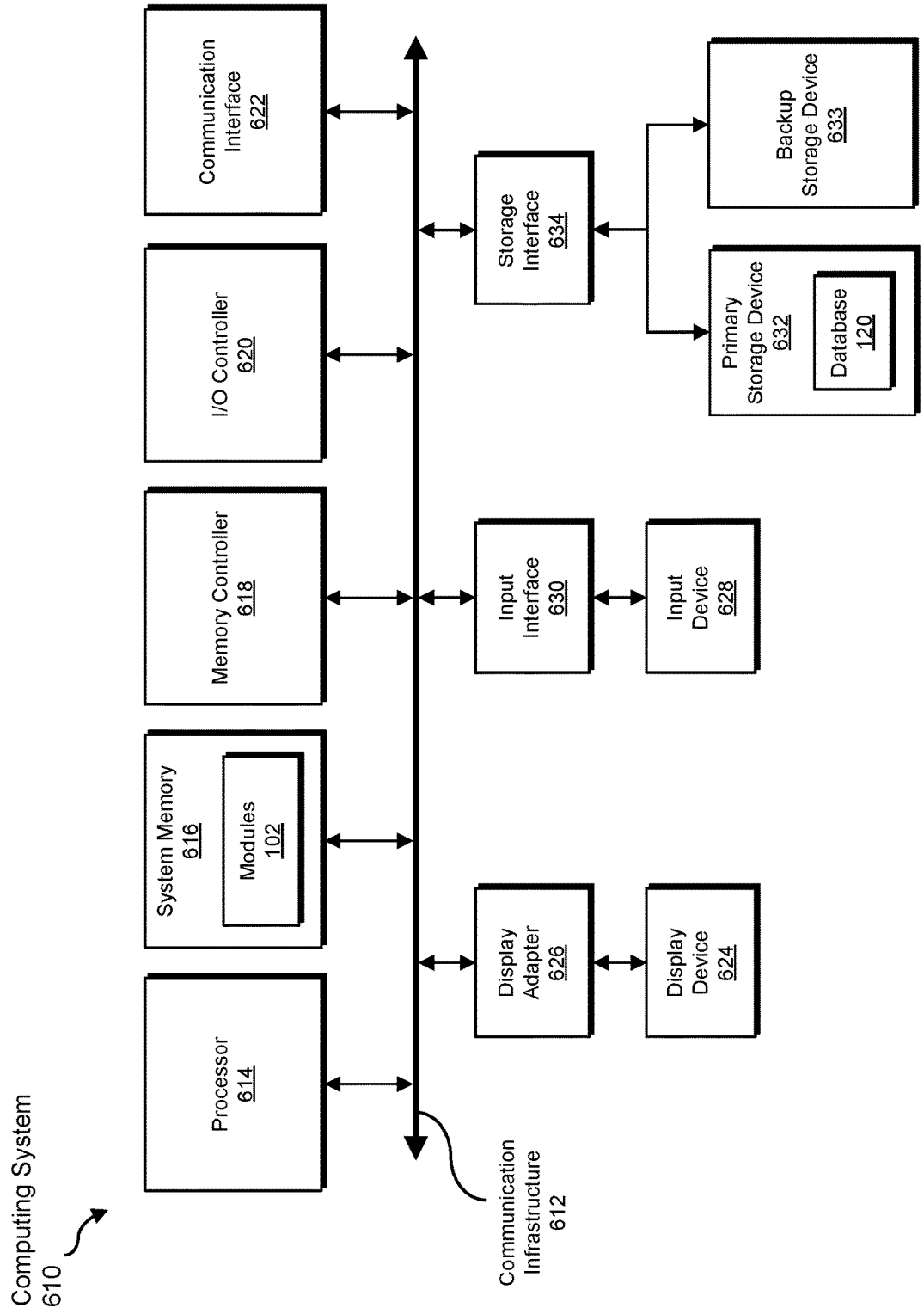
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, database 120 from FIG. 1 may be stored in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
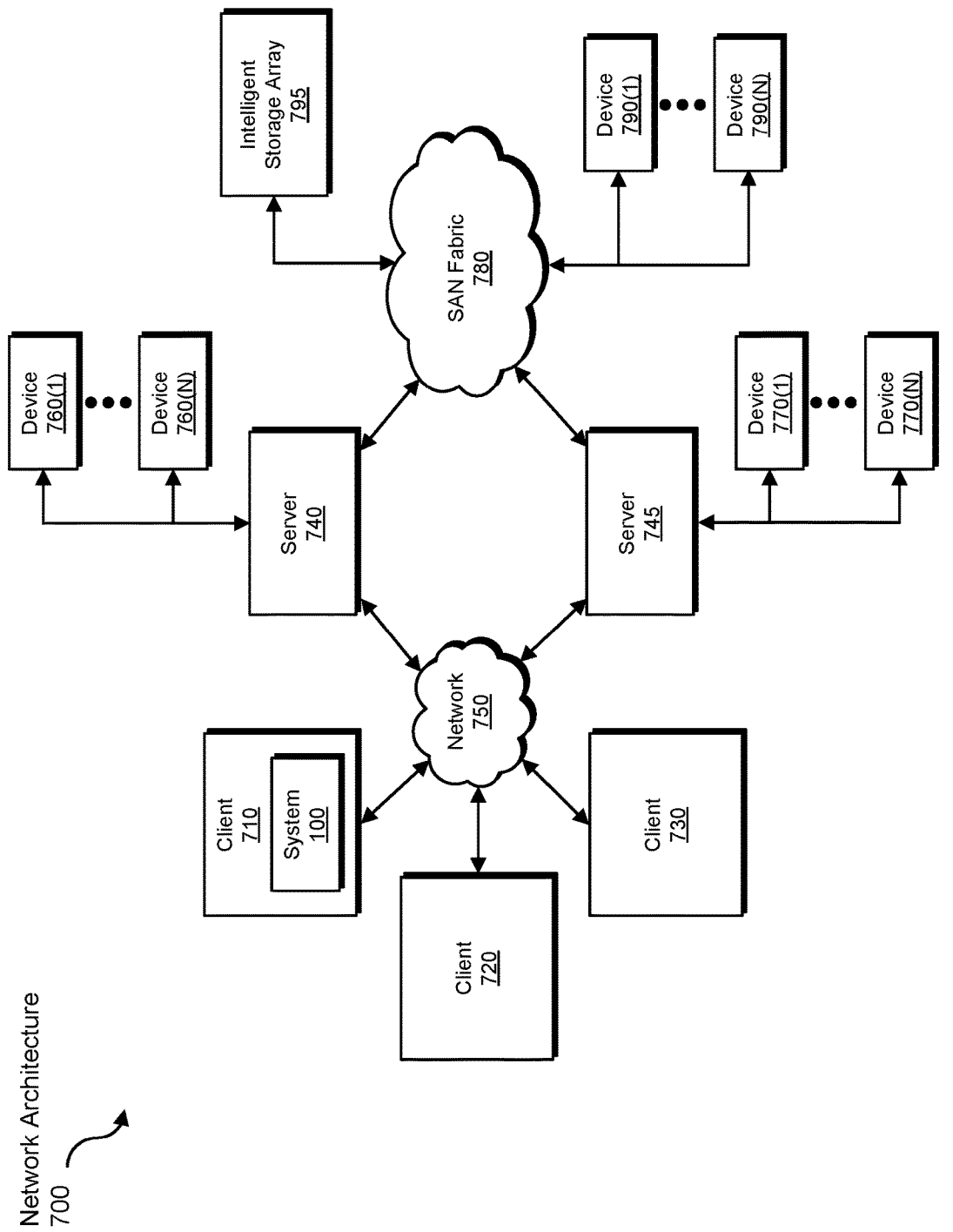
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for preparing email databases for analysis.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive email data to be transformed, transform the email data into a different format and/or schema, output a result of the transformation to a dataset, use the result of the transformation to create files, and store the result of the transformation to a database. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for preparing email databases for analysis, at least a portion of the method being performed by a computing device comprising at least one processor, the method comprising:

identifying an email database that stores a plurality of emails in a plurality of tables that are formatted to be managed by a specific email application;

using a component of the specific email application to retrieve the plurality of emails from the database;

creating a denormalized dataset from the plurality of emails by combining email data from at least one table from the plurality of tables with email data from at least one other table from the plurality of tables, wherein the denormalized dataset has fewer tables than the email database;

determining a size of a data block to be read and analyzed by each application of a plurality of applications;

splitting at least a portion of the data from the denormalized dataset into a plurality of files, wherein a size of each file of the plurality of files is selected to be smaller than the size of the data block to be read and analyzed by each application of the plurality of applications; and exporting the plurality of files in an interoperable format that is capable of being read and analyzed by the plurality of applications, wherein the plurality of applications analyze the plurality of files to determine at least one of a sentiment of the combined email data or a presence of malicious code in the combined email data.

2. The computer-implemented method of claim 1, wherein the component of the specific email application comprises a dynamic link library that is used by the specific email application.

3. The computer-implemented method of claim 1, wherein using the component of the specific email application to retrieve the plurality of emails comprises using an application programming interface to communicate with the component of the application.

4. The computer-implemented method of claim 1, wherein the email database comprises a backup of a production email database where the plurality of emails originate.

5. The computer-implemented method of claim 1, wherein creating the denormalized dataset comprises combining all of the tables within the plurality of tables into a single table.

6. The computer-implemented method of claim 1, wherein the interoperable format comprises a columnar storage format.

7. A system for preparing email databases for analysis, the system comprising:

an identification module, stored in memory, that identifies an email database that stores a plurality of emails in a plurality of tables that are formatted to be managed by a specific email application;

a retrieval module, stored in memory, that uses a component of the specific email application to retrieve the plurality of emails from the database;

a creation module, stored in memory, that creates a denormalized dataset from the plurality of emails by combining email data from at least one table from the plurality of tables with email data from at least one other table from the plurality of tables, wherein the denormalized dataset has fewer tables than the email database;

an export module, stored in memory, that determines a size of a data block to be read and analyzed by each application of a plurality of applications, that splits at least a portion of the data from the denormalized dataset into a plurality of files, wherein a size of each file of the plurality of files is selected to be smaller than the size of the data block to be read and analyzed by each application of the plurality of applications, and that exports the plurality of files in an interoperable format that is capable of being read and analyzed by the plurality of applications, wherein the plurality of applications analyze the plurality of files to determine at least one of a sentiment of the combined email data or a presence of malicious code in the combined email data; and at least one physical processor configured to execute the identification module, the retrieval module, the creation module, and the export module.

8. The system of claim 7, wherein the component of the specific email application comprises a dynamic link library that is used by the specific email application.

9. The system of claim 7, wherein the retrieval module uses the component of the specific email application to retrieve the plurality of emails by using an application programming interface to communicate with the component of the application.

10. The system of claim 7, wherein the email database comprises a backup of a production email database where the plurality of emails originate.

11. The system of claim 7, wherein the creation module creates the denormalized dataset by combining all of the tables within the plurality of tables into a single table.

12. The system of claim 7, wherein the interoperable format comprises a columnar storage format.

13. A non-transitory computer-readable medium comprising one or more computer-readable instructions that, when executed by at least one processor of a computing device, cause the computing device to:

identify an email database that stores a plurality of emails in a plurality of tables that are formatted to be managed by a specific email application;

use a component of the specific email application to retrieve the plurality of emails from the database;

create a denormalized dataset for the plurality of emails by combining email data from at least one table from the plurality of tables with email data from at least one other table from the plurality of tables, wherein the denormalized dataset has fewer tables than the email database;

determine a size of a data block to be read and analyzed by each application of a plurality of applications;

split at least a portion of the data from the denormalized dataset into a plurality of files, wherein a size of each file of the plurality of files is selected to be smaller than the size of the data block to be read and analyzed by each application of the plurality of applications; and export the plurality of files in an interoperable format that is capable of being read and analyzed by the plurality of applications, wherein the plurality of applications analyze the plurality of files to determine at least one of a sentiment of the combined email data or a presence of malicious code in the combined email data.

14. The non-transitory computer-readable medium of claim 13, wherein the component of the specific email application comprises a dynamic link library that is used by the specific email application.

15. The non-transitory computer-readable medium of claim 13, wherein the one or more computer-readable instructions cause the computing device to use the component of the specific email application to retrieve the plurality of emails by using an application programming interface to communicate with the component of the application.

16. The non-transitory computer-readable medium of claim 13, wherein the email database comprises a backup of a production email database where the plurality of emails originate.

17. The non-transitory computer-readable medium of claim 13, wherein the one or more computer-readable instructions cause the computing device to create the denormalized dataset by combining all of the tables within the plurality of tables into a single table.

\* \* \* \* \*